United States Patent
Groves

[15] 3,678,778
[45] July 25, 1972

[54] ADJUSTABLE STEERING COLUMN
[72] Inventor: Donald W. Groves, Birmingham, Mich.
[73] Assignee: Ford Motor Company, Dearborn, Mich.
[22] Filed: Sept. 21, 1970
[21] Appl. No.: 73,826

[52] U.S. Cl. ............................................................ 74/493
[51] Int. Cl. ........................................................ B62d 1/18
[58] Field of Search ............. 74/493, 492; 180/78; 280/82 A

[56] References Cited

UNITED STATES PATENTS

| | | | |
|---|---|---|---|
| 3,245,282 | 4/1966 | Kimberlin | 74/493 |
| 3,267,766 | 8/1966 | Glover et al. | 74/493 |
| 2,865,222 | 12/1958 | Bachman | 74/493 |
| 3,533,302 | 10/1970 | Hansen | 74/493 |

*Primary Examiner*—Milton Kaufman
*Attorney*—John R. Faulkner and Clifford L. Sadler

[57] ABSTRACT

An adjustable steering wheel mechanism particularly suitable for commercial vehicles and having a movable steering wheel support that moves along an axis extending at an acute angle to the axis of the steering shaft. A spring pressed locking bolt mechanism secures the steering wheel support in any one of several positions as selected and adjusted by the vehicle operator.

8 Claims, 4 Drawing Figures

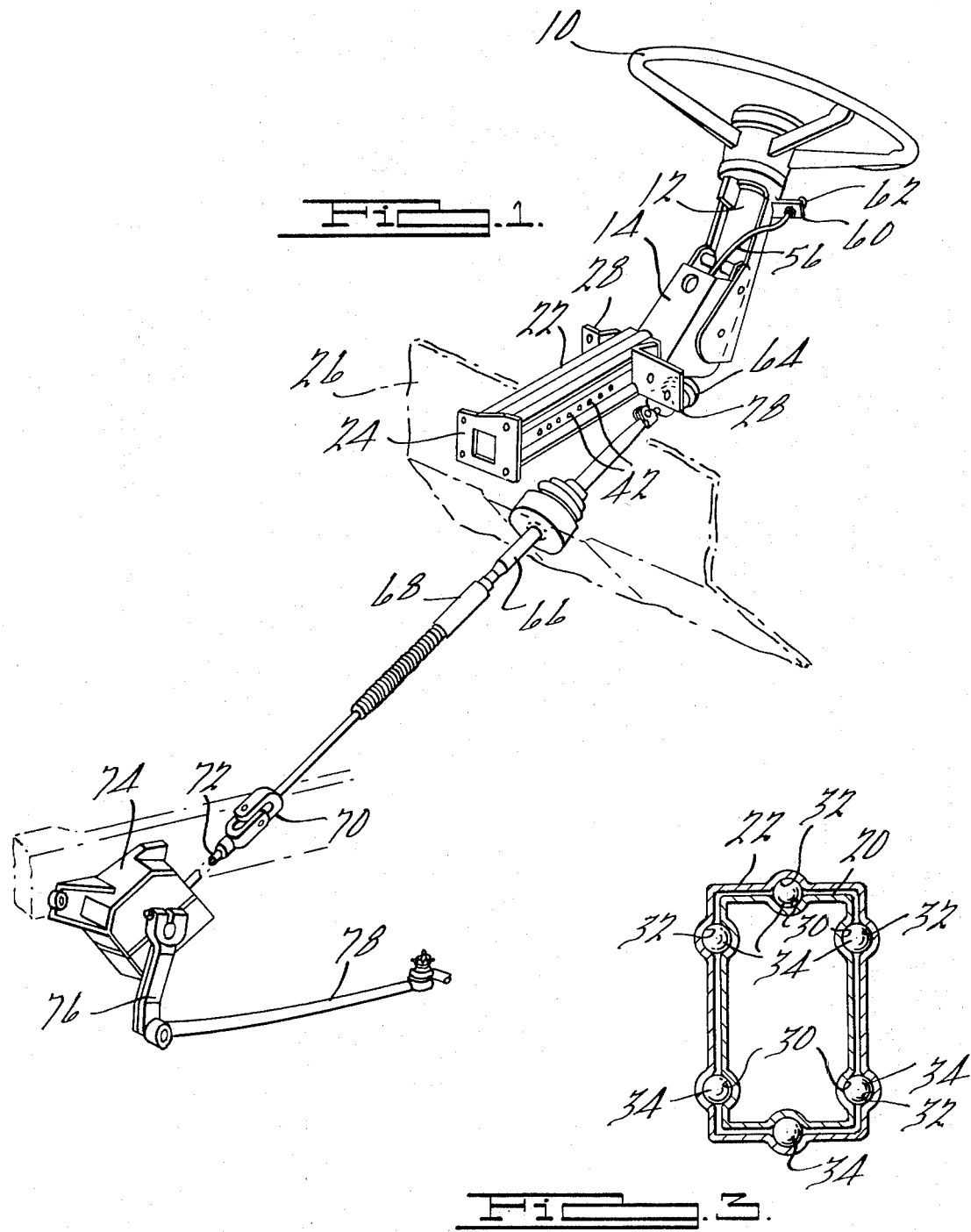

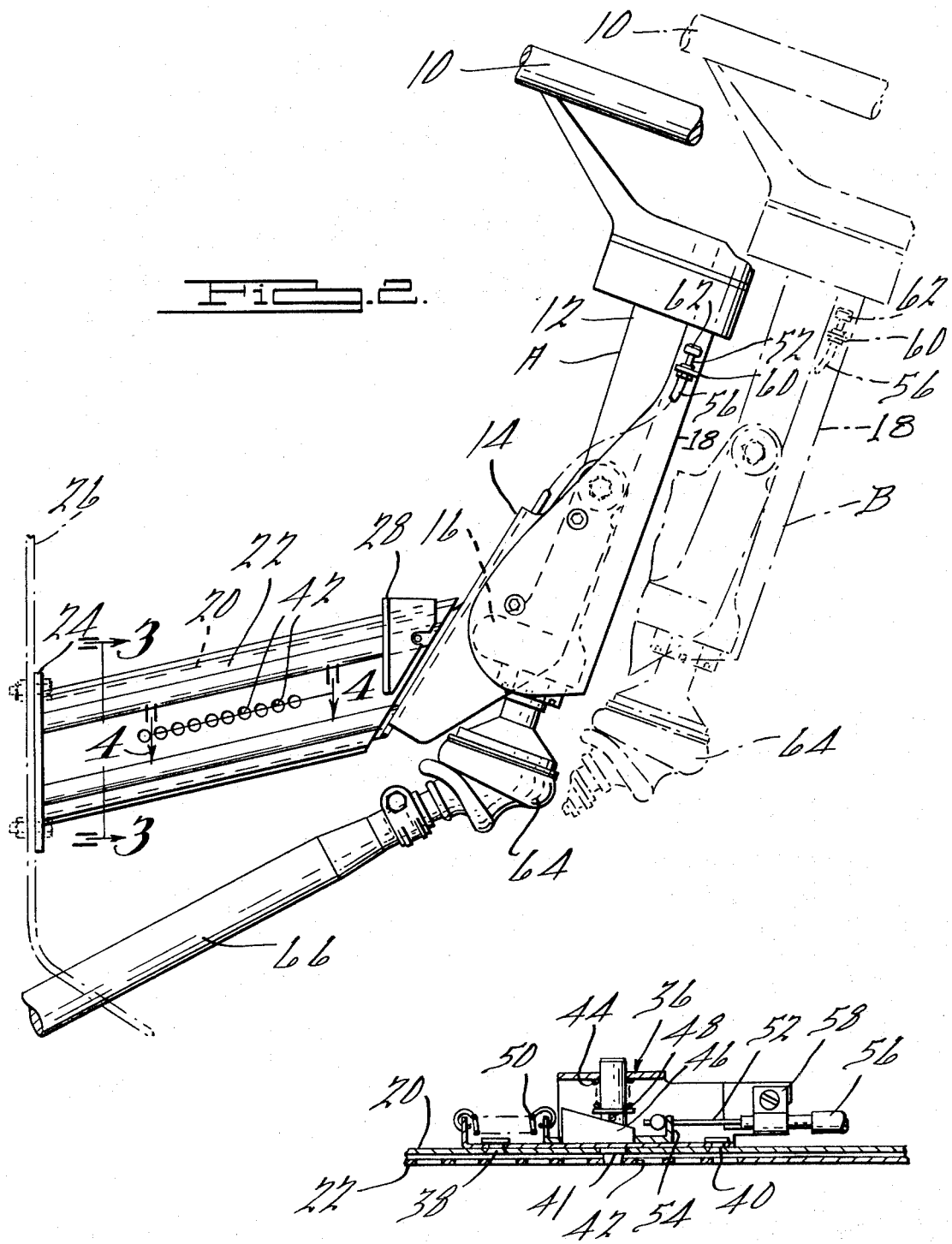

ADJUSTABLE STEERING COLUMN

BACKGROUND OF THE INVENTION

The present practice in most vehicles is to provide an adjustable driver seat so that the most comfortable position relative to the accelerator, brake and other control pedal can be obtained by the driver as determined by the length of his legs. However, if the steering column and wheel cannot be adjusted, the position of the steering wheel will, more often than not, be incorrect. If a short driver adjusts the seat to a forward position so that the control pedals may be reached, then the steering wheel will probably be too close to the driver's body. On the other hand, a tall driver who has moved the seat rearwardly may find that the steering wheel is too far away to be within comfortable reach of his arms.

This condition has been overcome in some passenger automobiles by providing adjustable telescopic steering shafts and columns. In a passenger car, the steering shaft is coaxially disposed within a generally tubular steering column assembly. The axis of the passenger car steering column is arranged at a slight angle to the horizontal so that telescopic movement of an adjustable column displaces the steering wheel longitudinally within the vehicle.

The arrangement of the steering wheel and shaft in most commercial vehicles makes the passenger car type telescopic column unsuitable for such an application although the need for an adjustable application steering wheel is just as great or even greater. This situation is particularly apparent in trucks of the cab-over-engine or forward cab variety. In vehicles of this type, where the driver's seat is situated nearly directly above the front axle, the steering wheel is disposed at a slight angle to a horizontal plane rather than a vertical plane as in a passenger car. The nearly horizontal arrangement of the plane of the rim of the steering wheel is typically exemplified by city transit busses. Telescopic movement of the steering column (as in a passenger car) would merely move the steering wheel vertically in such commercial vehicles.

In view of the state of the art, it is the principal object of the present invention to provide an adjustable steering wheel for a commercial vehicle in which the wheel moves adjustably in a fore and aft direction along a line that intersects the axis of the steering wheel at an acute angle.

BRIEF DESCRIPTION OF THE PRESENT INVENTION

In one preferred embodiment of this invention, the steering wheel is connected to a steering shaft which, in turn, is rotatably supported in a support member. The axis of the shaft extends at a slight angle to a vertical line. A box section tubular member is rigidly secured at one end to the steering shaft support and its other end is slidably received in a second box section tubular member. The second member is rigidly mounted between the vehicle fire wall and the instrument panel. With this arrangement, the steering shaft support may be displaced inwardly or outwardly to bring the steering wheel closer or farther from the driver at his election. Unlike conventional telescopic steering columns of the automotive type, in the preferred embodiment of this invention the steering shaft is not coaxial with the telescopic support members.

A spring pressed locking bolt interconnects the adjustable telescopic support members. The locking bolt is operative by the vehicle operator to release or secure the members in a set selected position.

A second steering shaft extends between the vehicle steering gear and the lower end of the first mentioned steering shaft. The second steering shaft is located generally beneath the adjustable steering support members when viewed in side elevation.

BRIEF DESCRIPTION OF THE DRAWINGS

The many objects and advantages of the present invention will become apparent from the following description and the accompanying drawings, in which:

FIG. 1 is a perspective view of a vehicle steering mechanism having an adjustable steering wheel support constructed in accordance with this invention;

FIG. 2 is a side elevational view of a portion of the mechanism of FIG. 1 with phantom lines showing the steering wheel and related support members displaced to a rearwardly adjusted position;

FIG. 3 is a sectional view taken along section lines 3—3 of FIG. 2; and

FIG. 4 is a sectional view taken along section lines 4—4 of FIG. 2. This figure shows the structure of the locking mechanism interposed between the adjustable telescopic support members.

DETAILED DESCRIPTION OF THE PREFERRED EMBODIMENT

Referring now to the drawings, FIG. 1 discloses in perspective the presently preferred embodiment of this invention. In this view, a vehicle steering wheel 10 is supported on a mechanism permitting its longitudinal displacement by the vehicle driver. The steering wheel 10 is connected to a steering shaft 12 which, in turn, is connected to the dirigible road wheels of the vehicle in a manner as will be described later.

The shaft 12 is rotatably supported by a support member 14 that includes internal bearing structure 16. Support member 14 has a generally channel-shaped cross section configuration. A second channel-shaped member 18 is secured to the support 14 and encloses the rearward side of the steering shaft which is closest to the vehicle operator.

Member 14, which rotatably supports the steering shaft 12, is welded to a tubular member 20 which has a box-shaped cross sectional configuration as seen in FIG. 3. The member 20 is slidably fitted within a stationary tubular member 22. Member 22 has a forward flanged end 24 which is bolted to the fire wall 26 of the vehicle cab. Left and right attachment flanges 28 are welded to the tubular member 22 near its rearward end. The flanges 28 are secured to the vehicle's instrument panel.

The inner tubular member 20 has a generally tubular configuration with a plurality of axially extending grooves 30. Complementary grooves 32 are formed axially along the inner surface of the outer member 22. A series of steel balls 34 are positioned in the grooves 30 and 32. This structure permits the inner member 20, which forms a part of the steering shaft support, to slide axially freely within the outer tubular member 22.

In accordance with this invention, means are provided to lock the relative position of the members 20 and 22. A locking mechanism 36 (see FIG. 4) is secured to the wall of the tube 20 by means of screws 38 and 40. The mechanism 36 includes a locking bolt 41 that is constructed to protrude from the wall of the tube 20 and through any one of a series of holes 42 formed in the outer tubular support member 22.

The locking bolt 41 is slidably disposed within the mechanism 36 and is biased to a protruding position by a coil spring 44. A ramp member 46 engages a portion 48 of the bolt 41. A coil spring 50 engages a portion of the ramp mechanism 46 and urges it in a left-hand position (as seen in FIG. 4) to permit the protrusion of the bolt 41 under the force of spring 44. In accordance with this invention, means are provided to displace the ramp 46 to the right to withdraw the bolt 41 inwardly into the interior of the tube 20. A Bowden wire has its inner cable 52 secured to a flanged portion 54 of the ramp mechanism 46. The cable 52 is situated within the casing 56 that is secured by a clamp 58 to the body of the mechanism 36. The other end of the casing 56 is secured to a flange 60 (FIGS. 1 and 2) which is welded to the structure 18 encasing the steering shaft 12. A control knob 62 is connected to the end of the cable 52 protruding through the flange 60.

Thus, with this structure the vehicle operator may pull the control knob 62 upwardly causing the ramp mechanism 46 to move to the right (in FIG. 4) and the bolt 41 to be withdrawn inwardly into the interior of the tubular member 20. This movement of the bolt 41 permits the inner tubular member 20 to be displaced axially with respect to the outer tubular member 22.

When the locking mechanism of FIG. 4 is disengaged, the support member 14 for the shaft 12 and the tubular member 20 connected thereto may be moved forwardly or rearwardly by the vehicle operator. Referring to FIG. 2, the steering wheel is shown in a forward position identified by reference letter A. It may, however, be displaced rearwardly to the location shown in the phantom lines and identified by reference letter B.

As indicated previously, the upper end of the steering shaft 12 is connected to the steering wheel 10. A universal joint 64 is connected to the lower end of the shaft 12. The joint 64 serves as a connection between the shaft 12 and a steering shaft assembly 66. The shaft assembly 66 includes a telescopic portion 68. The lower end of the steering shaft assembly 66 is connected to a universal joint 70 which, in turn, is connected to the input shaft 72 of a steering gear 74. The gear 74 has a Pitman arm 76 that is connected to steering gear linkage 78. With this structure motion can be transmitted from the wheel 10 to the vehicle's steering linkage 78 and dirigible wheels (not shown) to permit the driver to steer the vehicle in a conventional manner.

The shaft assembly 66, with its telescopic portion 68, provides a torque transmitting path from the steering wheel 10 the gear 74 while permitting generally longitudinal displacement of the wheel 10 within the driver's compartment or cab.

SUMMARY

By manipulation of the knob 62, the vehicle operator is capable of disengaging the lock mechanism of FIG. 4 to permit relative displacement of the tubular members 20 and 22. The ball bearing mechanism of FIG. 3 permits the ready axial movement of the steering shaft support so that the wheel 10, steering shaft 12 and steering shaft support structure 14 may be moved from the position A to the position B or to an intermediate position to suit the physical characteristics of the vehicle operator. Once the desired position is reached, the knob 62 is released and the bolt 40 engages the nearest one of the series of holes 42 to lock the tubular support members 20 and 22 in fixed relative position.

The foregoing description presents the presently preferred embodiment of this invention. Alterations and modifications may occur to those skilled in the art that will come within the scope and spirit of the following claims.

I claim:

1. A steering mechanism for a motor vehicle including vehicle body structure,
    a steering wheel,
    an upper steering shaft having one end connected to said steering wheel,
    support structure rotatably supporting said upper shaft,
    adjustable support means interconnecting said support structure and said body structure,
    said adjustable support means being constructed to accommodate displacement of the center of said steering wheel along a line extending at an angle to the axis of said upper shaft,
    a steering gear supported on said body structure,
    lower steering shaft means interconnecting the other end of said upper shaft and said steering gear,
    said lower shaft means including a shaft portion having an axis angularly displaced from both said line along which said steering wheel center is displaceable and from the axis of said upper steering shaft when viewed in side elevation.

2. An adjustable steering wheel mechanism for a motor vehicle having body structure comprising:
    an upper steering shaft,
    a first support member rotatably supporting said upper steering shaft section,
    a steering wheel connected to the upper end of said upper steering shaft,
    a second support member connected to said body structure,
    said first support member slidably engaging said second member and constructed to permit the displacement of the center of said steering wheel along a line angularly displaced from the axis of said upper steering shaft,
    a steering gear secured to said body structure and having an input shaft,
    an axially extendible lower steering shaft,
    coupling means connecting the lower end of said upper shaft to said lower shaft,
    coupling means connecting said lower shaft to said input shaft of said steering gear,
    said extendable shaft including a shaft portion having an axis angularly disposed relative to the line of displacement of said steering wheel center and to the axis of said upper steering shaft when viewed in side elevation.

3. An adjustable steering wheel mechanism for a motor vehicle according to claim 2 and including:
    latch means interposed between said first and second support members and constructed to hold said support members in a set relative position,
    release means connected to said latch means and constructed to be actuated by the vehicle operator to permit the relative displacement of said support members.

4. An adjustable steering wheel mechanism for a motor vehicle according to claim 3 and including:
    said first support member having a tubular portion,
    said second support member having a tubular portion,
    said tubular portions being telescopically interconnected.

5. An adjustable steering wheel mechanism for a motor vehicle comprising:
    a steering shaft,
    a steering wheel connected to one end of said steering shaft,
    a universal joint connected to the other end of said shaft,
    said joint being constructed in part to connect said shaft to a steering gear,
    a rigid member rotatably supporting said steering shaft,
    a support assembly having a pair of slidably related members,
    one of said members being connected to said rigid member,
    the other of said members being constructed to be connected to vehicle support structure,
    said one member being linearly displaceable relative to said other member along a central axis extending at an angle to the axis of rotation of said steering wheel and intersecting said steering shaft at a point intermediate its said ends.

6. An adjustable steering wheel mechanism for a motor vehicle having vehicle body structure comprising:
    a steering wheel,
    a first steering shaft having one end connected to said steering wheel,
    support structure rotatably supporting said first shaft,
    adjustable support means interconnecting said support structure and said body structure,
    said adjustable support means being constructed to accommodate displacement of the center of said steering wheel along a line extending at an angle to the axis of said first shaft,
    a second steering shaft connected to the other end of said first shaft and constructed to be connected to a steering gear,
    the axis of said second steering shaft intersecting at an acute angle an extension of said line along which said steering wheel center is displaceable.

7. An adjustable steering wheel mechanism for a motor vehicle having body structure comprising:
    an upper steering shaft,
    a lower steering shaft,
    universal joint means interconnecting said upper and lower shafts,
    said lower shaft being constructed to be connected to a steering gear, a first support member rotatably supporting said upper steering shaft, a steering wheel connected to the upper end of said upper steering shaft, a second support member connected to said body structure, said first support member slidably engaging said second support member and constructed to permit the displacement of the center of said steering wheel along a line angularly displaced from the axis of said upper steering shaft, the axis of said lower steering shaft intersecting at an acute angle an extension of said line along which said steering wheel center is displaceable, latch means interposed between said first and second support members and constructed to hold said support members in a set relative position, release means connected to said latch means and constructed to be actuated by a vehicle operator to permit the relative displacement of said support members.

8. An adjustable steering wheel mechanism for a motor vehicle having body structure comprising:

an upper steering shaft and a lower steering shaft, universal joint means interconnecting said upper and lower shafts, said lower shaft being constructed to be connected to a steering gear, a steering wheel connected to the upper end of said upper steering shaft, a support member rotatably supporting said upper steering shaft, a first tubular member secured to said support member, a second tubular member connected to said body structure, said first tubular member telescopically engaging said second tubular member and constructed to permit the displacement of the center of said steering wheel along a line angularly displaced from the axis of said upper steering shaft, said upper and lower steering shafts being both disposed exteriorly of said first and second tubular member, latch means interposed between said first and second tubular members and constructed to hold said tubular members in a set relative position, release means connected to said latch means and constructed to be actuated by a vehicle operator to permit the relative displacement of said tubular members.

* * * * *